United States Patent [19]

Fricker et al.

[11] Patent Number: 4,649,835
[45] Date of Patent: Mar. 17, 1987

[54] SUPPORTING STRUCTURE FOR HEAT INSULATION

[75] Inventors: Wolfgang Fricker, Freinsheim; Zdenek Klikos, Ludwigshafen, both of Fed. Rep. of Germany

[73] Assignee: G+H Montage GmbH, Fed. Rep. of Germany

[21] Appl. No.: 715,015

[22] Filed: Mar. 22, 1985

[30] Foreign Application Priority Data

Mar. 23, 1984 [DE] Fed. Rep. of Germany ....... 3410859
Jun. 15, 1984 [DE] Fed. Rep. of Germany ....... 3422342

[51] Int. Cl.$^4$ .............................................. F23M 5/00
[52] U.S. Cl. ...................................... 110/336; 52/506; 432/247
[58] Field of Search ................ 110/336, 337; 432/247, 432/248; 52/506, 508; 165/136

[56] References Cited

U.S. PATENT DOCUMENTS 4,249,888 2/1981 Werych .......................... 110/336 X
4,453,475 6/1984 Ploger ............................... 110/336
4,549,382 10/1985 Byrd, Jr. ........................ 110/336 X Primary Examiner—Edward G. Favors
Attorney, Agent, or Firm—Remy J. VanOphem

[57] ABSTRACT

A supporting structure for supporting the heat insulation elements of a steam generator of the type that is used in the primary circuit of nuclear power stations. The supporting structure utilizes hanging ties which are suspended from suspension pivots that are attached to the building which houses the steam generator. The hanging ties have the heat insulation elements attached thereto, and are integrated into the construction of the heat insulation elements. The steam generator consists of separate parts which are joined by weld seams that are subject to periodic inspection, and the heat insulation elements are made up of fixed parts which are suspended from the hanging ties and which form spaces therebetween for access to the weld seams, the spaces between the fixed insulating elements being sealed off by removable thermal insulating elements.

20 Claims, 7 Drawing Figures

SUPPORTING STRUCTURE FOR HEAT INSULATION

BACKGROUND OF THE INVENTION

1. Field of the Invention

The present invention relates to a supporting structure and is directed in particular to a supporting structure for supporting heat insulation elements for insulating components, in particular, components of steam generators of the type that are used in the primary circuit of nuclear power stations.

2. Description of the Prior Art

In the case of a steam generator for a nuclear power station, the steam generator part in question is surrounded by a spaced group of vertical supports and brackets are attached to the supports for connection to brackets on fixed heat insulation elements which surround the steam generator part in question.

This structure obviously takes up considerable room and is impractical in particular when a testing machine must be moved to a certain place to test weld seams on the steam generator part after appropriate removable heat insulation elements have been removed. Difficulties also arise when the testing member of this device must be pushed forward across a relatively large distance to reach the seam or another part to be tested.

SUMMARY OF THE INVENTION

The present invention provides a supporting structure for heat insulation elements for a steam generator for a nuclear power station which requires much less room. This result is achieved, according to the present invention, through the use of hanging ties. The hanging ties, to which the heat insulation elements are attached, hang down from suspension pivots on the steam generator which are suspended with the steam generator component in the building which houses the steam generator.

In a preferred embodiment of the invention, the hanging ties are integrated into the construction of the heat insulation elements.

If the steam generator part in question is made up of a plurality of separate parts which are joined together by weld seams, these weld seams require regular inspection which is carried out at appropriate time intervals in accordance with applicable regulations. For this purpose the heat insulation elements which cover the weld seams are removed and the testing device is moved to the portion of the structure to be tested. According to the present invention, the heat insulation includes spaced-apart fixed parts which hang down and define spaces between the fixed parts, i.e., spaces where weld seams to be tested are located, and these spaces may be sealed off by insertions. The spaces themselves are bridged by bridges and the insertions which seal off the spaces are mounted to such bridges.

In an arrangement having bridges which bridge circumferentially extending seams, the insulation supporting structure according to the present invention is characterized by a hollow beam which bridges the vertical space between two fixed heat insulation parts, the beam being capable of being joined at its two ends to parts of the frame for the fixed heat insulation part in question, and preferably being provided in the middle with laterally protruding flanges. This results in a frame for the removable heat insulating elements to be inserted into this frame. An insulating material whose insulating properties are superior to those of the fixed heat insulation elements may be used in the construction of the removable heat insulation elements. Since the removable heat insulation elements generally have smaller dimensions that the fixed heat insulation elements, the additional expense for the superior heat insulating material is relatively insignificant. This superior heat insulating material provides for substantially even heat insulation to be provided all around the steam generator to be insulated.

The invention also applies to a supporting structure having longitudinal seam bridges. Each such longitudinal seam bridge is characterized by a sectional beam which conforms with the curvature of the insulated steam generator component and is screwed to the frame or to a part of the frame of the corresponding fixed heat insulation element. Since such longitudinal seams are in general mutually staggered, it is preferred that the hanging ties be divided and provided with bracing ties, each of which extends from the upper point of connection of the hanging tie to the corresponding fixed heat insulation element, penetrating the latter, possibly extending on a slant, and leading to the lower point of connection of a further hanging tie on this fixed heat insulation element. This provides a supporting structure which is completely balanced statically. This consideration also applies to the insertions of heat insulation elements in the longitudinally extending seam area as well as to insertions of heat insulation elements in the radially extending seam area.

In a further feature of the invention, the supporting structure includes tracks for the travel of any required testing devices or manipulators therefor, these tracks being advantageously arranged radially interiorly of the outer surface of the heat insulation elements carried by the supporting structure. This feature of the invention is particularly advantageous with respect to a steam generator of a nuclear power station because components of nuclear power stations must be periodically, mechanically tested, and the heat insulation elements in this area must not only be capable of being quickly dismounted and remounted, they must also be possible to install testing devices or manipulators therefor in this area. Up to now, special carrying structures for tracks for the travel of such devices were required for this purpose.

However, in older nuclear power stations, mechanized periodic testing using built-in manipulator tracks is not possible due to the lack of room. Only by integrating manipulator tracks into the supporting structure for the heat insulation elements and in particular by arranging the tracks radially interiorly of the outer surface of the heat insulation is it possible to save approximately 80% of the space previously required, making it possible, using the supporting structure according to the present invention, to perform complete mechanized periodic testing in old plants as well, after replacing the heat insulation.

In the following, the invention shall be described in more detail with reference to the drawings.

DETAILED DESCRIPTION OF THE PREFERRED EMBODIMENT

Figure 1:
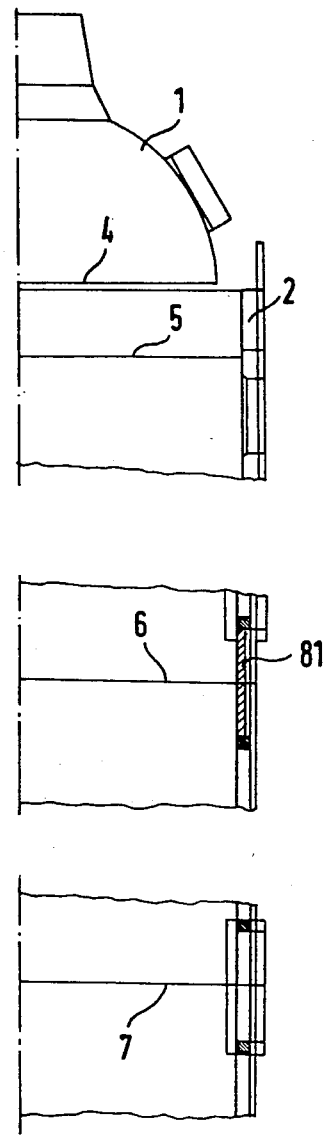
FIG. 1 is a side view of a steam generator in a nuclear power station, the lower part of this steam generator being omitted and the heat insulation elements thereof shown only in cross-section.
Figure 2:
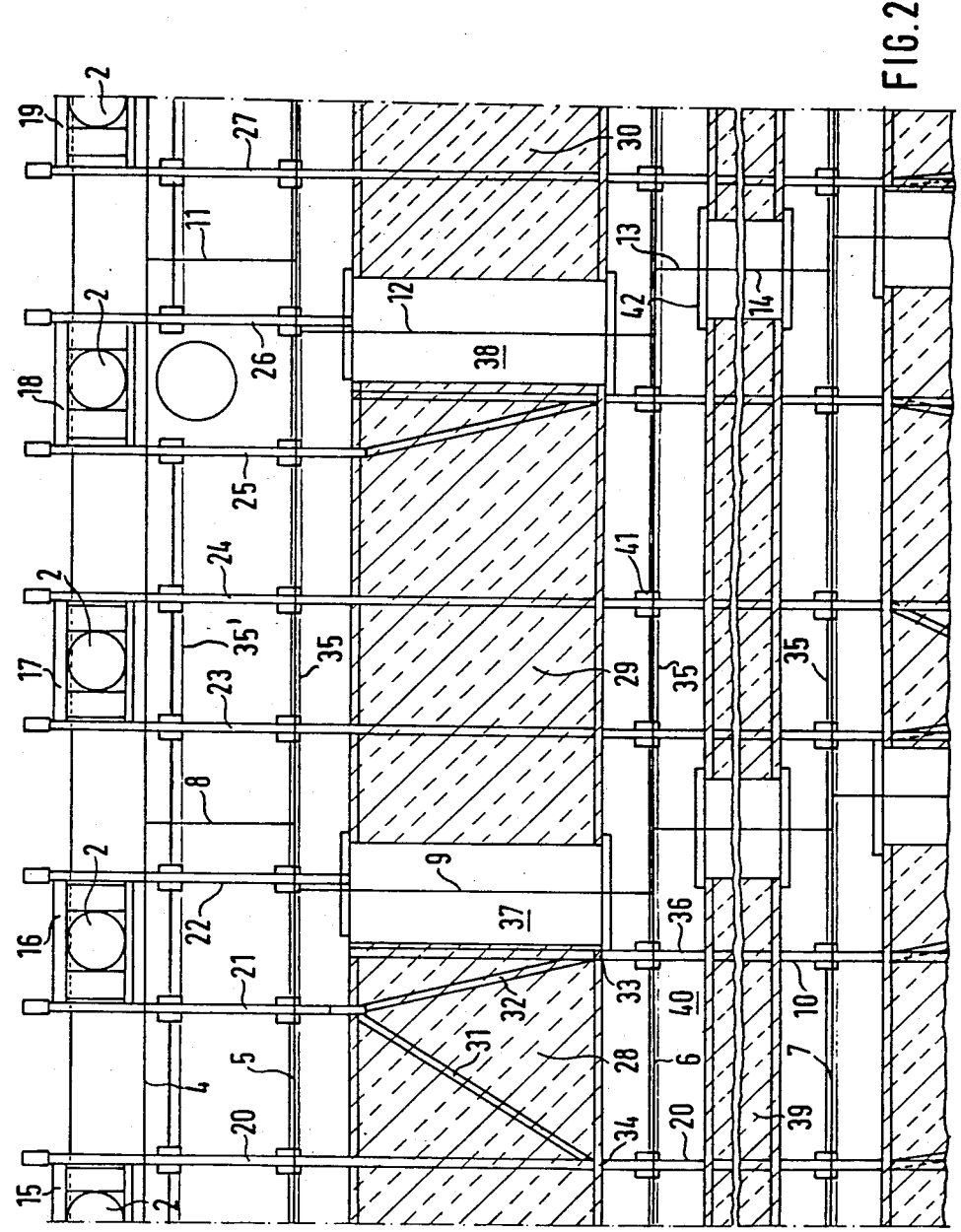
FIG. 2 is a developed fragmentary view, at an enlarged scale, showing the suspended structure and the fixed parts of the heat insulation elements shown in FIG. 1, FIG. 2 including a showing of certain elements that are omitted from FIG. 1 for the sake of clarity.

In FIG. 1, 1 refers to an installation, for example a steam generator of a nuclear power station, which is suspended via pivots 2 on a suspension means (not shown) of the power station building. This installation consists of a plurality of separate sections which are joined together in each case by circumferentially extending weld seams 4, 5, 6, and 7. The weld seams 4 through 7 are joined by longitudinally extending weld seams which can be seen in FIG. 2, for example, at 8, 9, 10, 11, 12, 13, and 14. FIG. 2 also shows suspensions for hanging ties at 15, 16, 17, 18, and 19, the hanging ties being identified in FIG. 2 by reference numerals 20, 21, 22, 23, 24, 25, 26, and 27. The hanging ties 20 through 27 serve the purpose of supporting fixed heat insulation elements, which are indicated in FIG. 2 by hatching at 28, 29, and 30. For structural reasons, it may be necessary, not just to conduct the hanging ties straight through the heat insulation elements, but to supplement them within the heat insulation elements, for example by oblique braces 31 and 32 in the fixed heat insulation element 28. These braces lead, for example in the case of fixed heat insulation element 28, from a common suspension point on the hanging tie 21 to attachment points 34 and 33 for the continuation of the hanging tie 20 or a new hanging tie 36, respectively. Other similar hanging ties can be seen in the drawing and need not be described in more detail.

It can be seen in FIG. 2 that spaces 37 and 38 are left between the fixed heat insulation elements 28, 29, and 30, these spaces being in front of longitudinally extending seams 9 and 12, respectively. A similar space 40 exists between fixed heat insulation elements 28 and 39. In this case the space 40 exposes the circumferentially extending weld seam 6.

FIG. 2 also indicates tracks 35 provided in the area of the circumferentially extending weld seams 5, 6, and 7, as well as a track 35' just below circumferentially extending weld seam 4 for the travel of testing devices or manipulators therefor when required. One of these tracks 35 is shown in cross-section in FIG. 3. It is attached to angles 45 and 46, which will be dealt with below in more detail, and is located radially interioraly of the surface of the heat insulation element.

Figure 5:
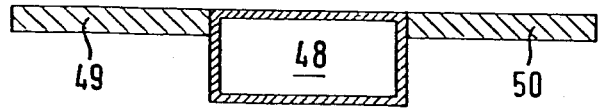
FIG. 5 is a sectional view taken along line V—V of FIG. 4.
Figure 4:
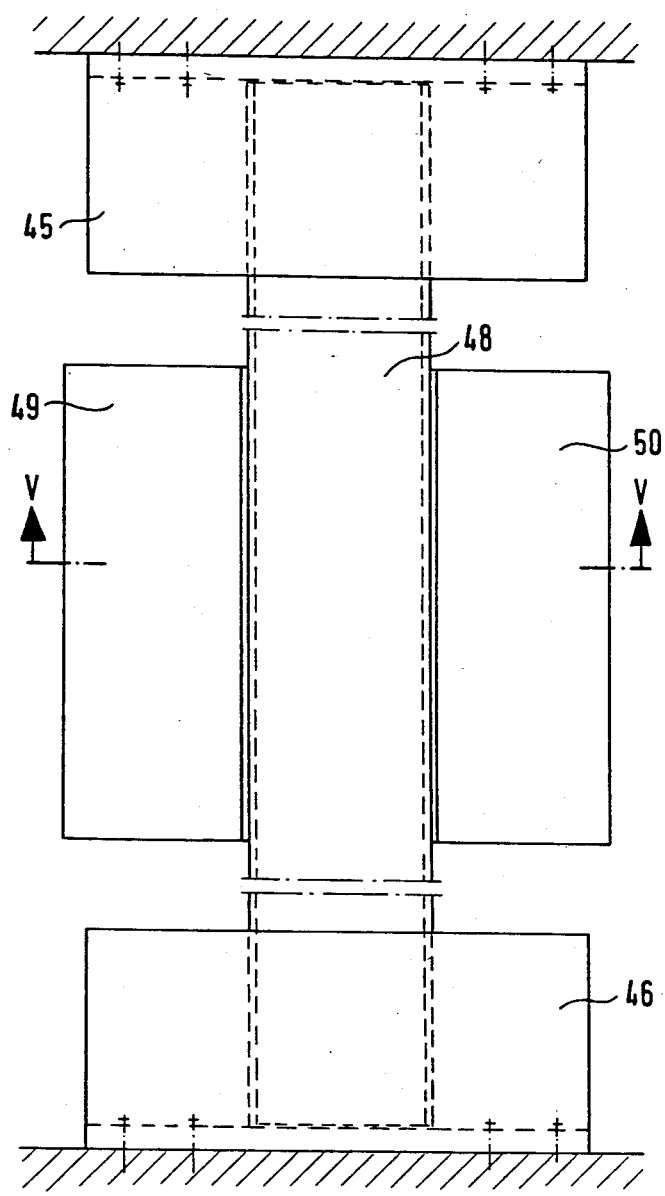
FIG. 4 is a front view of the bridge of FIG. 3.

The spaces between the individual fixed heat insulation parts are bridged. At 41 one can see a circumferentially extending seam bridge which is shown in detail in FIGS. 3 and 5, while at 42 one can see a longitudinally extending seam bridge which is shown in detail in FIGS. 6 and 7.

Figure 3:
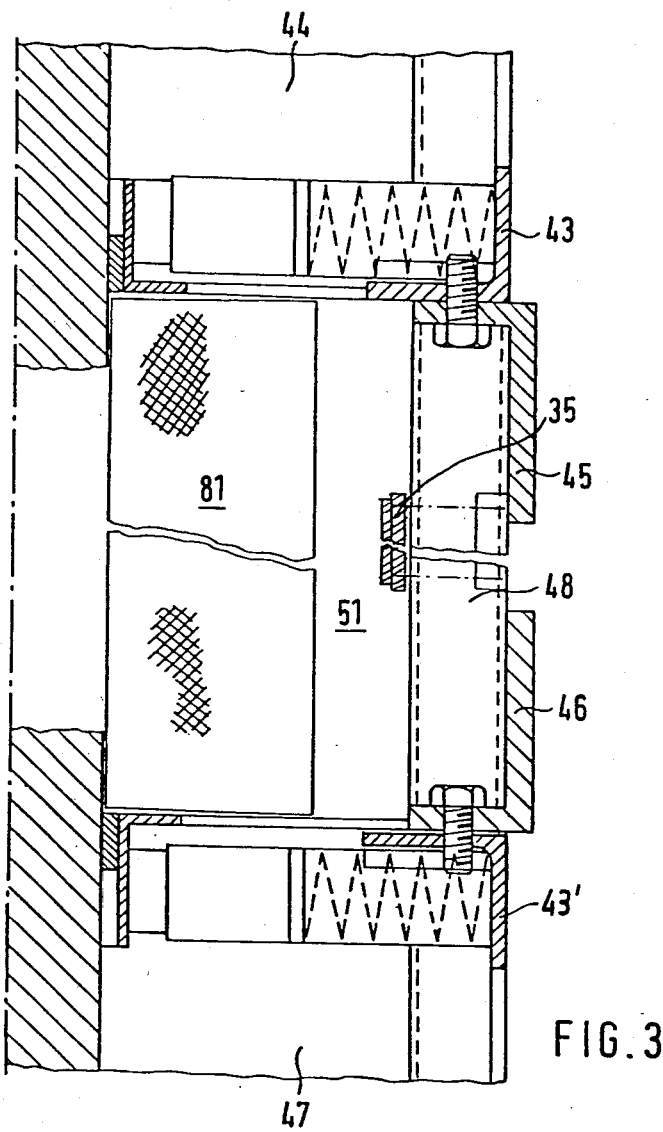
FIG. 3 is a side view, partially in cross-section, of a circumferentially extending seam bridge in its connection with an upper and a lower fixed heat insulation element.

It can be seen in FIG. 3 that the angle 45 is screwed an inner frame part 43 of fixed heat insulation element 44, and the angle 46 is screwed to a similar inner frame part 43' of a fixed heat insulation element 47. The two angles are bridged by a sectional beam 48 which bears two flanges 49 and 50 welded in the middle thereon. The sectional beam 48 can also be seen in FIG. 5, which also shows the attachment of the flanges 49 and 50.

Thus, a bridge is formed in the space between the two fixed heat insulation elements 44 and 47, an insert 81 being inserted in a space 51 behind this bridge in the direction of the steam generator. This insert is also a heat insulation element, but is formed of a thermal insulating material of somewhat higher quality than that used in fixed heat insulation elements 44 and 47, so that uniform thermal insulating properties extend across the entire surface.

Figure 6:
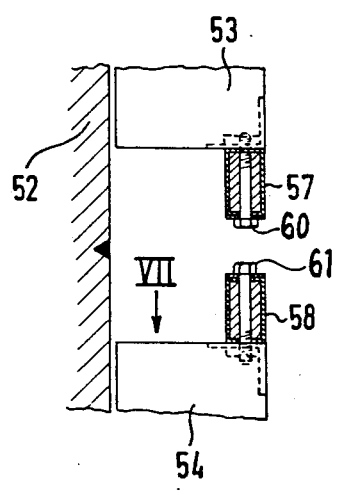
FIG. 6 is a partial sectional view of a longitudinally extending seam bridge of the suspended structure in FIG. 2.
Figure 7:
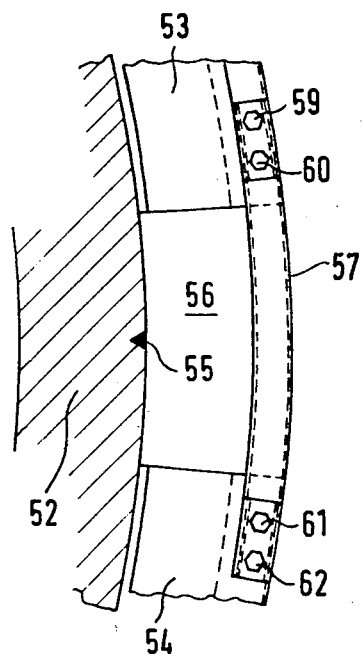
FIG. 7 is a plan view taken in the direction of arrow VII of FIG. 6.

The bridging of the longitudinally extending seams can be seen in FIGS. 6 and 7. The wall to be insulated can be seen at 52. Numeral 53 refers to a fixed heat insulation element. Numeral 54 is also a fixed heat insulation element. In order to make a seam 55 accessible, a space is left which is identified generally by reference numeral 56 in FIG. 7. It is bridged at the top and at the bottom by bridge elements 57 and 58, which are screwed down via screws 59, 60 and 61, 62, respectively, on angles in the framework of the fixed heat insulation elements, and may thus be removed when necessary.

Having thus described the present invention by way of an exemplary embodiment, it will be apparent to those skilled in the art that many modifications may be made from the exemplary embodiment without departing from the spirit of the present invention or the scope of the claims appended thereto.

What is claimed is:

1. A device for operation at elevated temperatures, said device comprising:
   a plurality of components;
   weld means joining said plurality of components to one another;
   a plurality of fixed heat insulation elements for insulating said plurality of components; and
   a supporting structure supporting said plurality of heat insulation elements between said weld means to insulate said plurality of components of said device while permitting access to said weld means, said supporting structure comprising:
   a plurality of fixed pivots operatively associated with said device; and
   a plurality of hanging ties, each of said hanging ties being attached to one of said fixed pivots and extending into said device, each of said heat insulation elements being supported by at least one of said hanging ties.

2. The device according to claim 1 wherein each of said heat insulation elements is supported by at least two of said hanging ties.

3. The device according to claim 1 wherein said device is a steam generator of the type that is used in the primary circuit of a nuclear power station.

4. The combination of a building and the device according to claim 3 located within said building, each of said fixed pivots being attached to said building.

5. The device according to claim 2 wherein each of said at least two of said hanging ties extends through each of said heat insulation elements.

6. The device according to claim 1 wherein at least two of said plurality of fixed heat insulation elements are spaced apart from one another and define at least one space between said at least two of said plurality of fixed heat insulation elements, said at least one space being aligned with said weld means and permitting access to said weld means through said at least one space, and further comprising:
    removable heat insulation means positioned in said at least one space to insulate said weld means when it is not desired to obtain access to said weld means.

7. The device according to claim 6 wherein said removable heat insulation means is removably attached to one of said at least two of said plurality of fixed heat insulation elements.

8. The device according to claim 7 wherein said removable heat insulation means comprises a plurality of heat insulation elements, one of said removable heat insulation elements being removably attached to said one of said at least two of said plurality of fixed heat insulation elements, a second of said removable heat insulation elements being removably attached to a second of said at least two of said plurality of fixed heat insulation elements.

9. The device according to claim 1 wherein at least two of said plurality of fixed heat insulation elements are spaced apart from one another and define at least one space between said at least two of said plurality of fixed heat insulation elements, said at least one space being aligned with said weld means and permitting access to said weld means through said at least one space, and further comprising:
    removable bridge means bridging said at least one space, said removable bridge means comprising a first end which is removably attached to a first of said at least two of said plurality of fixed heat insulation elements and a second end which is removably attached to a second of said at least two of said plurality of fixed heat insulation elements.

10. The device according to claim 9 further comprising removable heat insulation means positioned in said at least one space to insulate said weld means when it is not desired to obtain access to said weld means.

11. The device according to claim 9 wherein said removable bridge means is positioned between said removable heat insulation means and said weld means.

12. The device according to claim 9 wherein said weld means extends in a straight line and wherein said removable bridge means is spaced from said weld means and extends generally parallel to said weld means.

13. The device according to claim 9 wherein said weld means extends curvilinearly and wherein said removable bridge means is spaced from said weld means and extends generally concentrically with said weld means.

14. The device according to claim 2 wherein at least one of said at least two hanging ties comprises:
    a first portion having a first end which is attached to said one of said fixed pivots and a second end which is spaced generally vertically below said first end of said first portion; and
    a second portion, said second portion extending at an oblique angle generally outwardly and downwardly from said second end of said first portion.

15. The device according to claim 14 wherein said at least one of said hanging ties further comprises a third portion, said third portion extending at a second oblique angle generally outwardly and downwardly from second end of said first portion.

16. The device according to claim 15 wherein said second oblique angle is different than said oblique angle.

17. The device according to claim 16 wherein said second portion of said at least one of said at least two hanging ties and said third portion of said at least one of said at least two hanging ties extend through one of said plurality of fixed heat insulation elements.

18. The device according to claim 6 further comprising track means carried by said plurality of components and extending adjacent to said weld means, said track means adapted to accommodate the travel of means for periodically inspecting said weld means, said at least one space being aligned with said track means.

19. The device according to claim 18 wherein said track means is interposed said plurality of components and said plurality of fixed heat insulation elements.

20. The device according to claim 18 wherein said device is a steam generator of the type that is used in the primary circuit of a nuclear power station.

* * * * *

UNITED STATES PATENT AND TRADEMARK OFFICE
CERTIFICATE OF CORRECTION

PATENT NO. : 4,649,835

DATED : March 17, 1987

INVENTOR(S) : Fricker et al

It is certified that error appears in the above-identified patent and that said Letters Patent is hereby corrected as shown below:

Column 3, line 14, after "structure" insert ---- shown ----.

Column 4, line 3, after "screwed" insert ---- to ----.

In the Claims

Column 4, line 51, kindly insert a paragraph indention.

Column 4, line 53, kindly insert a paragraph indention.

Signed and Sealed this

Seventeenth Day of November, 1987

Attest:

DONALD J. QUIGG

Attesting Officer

Commissioner of Patents and Trademarks